United States Patent
Ciancaglini et al.

(10) Patent No.: US 7,646,979 B1
(45) Date of Patent: Jan. 12, 2010

(54) MULTIPLE ACCESS PROTOCOL SYSTEM AND RELATED TECHNIQUES FOR MULTI-GIGABIT OPTICAL WAVELENGTH DIVISION MULTIPLEXED LOCAL AREA NETWORKS

(75) Inventors: Gene Ciancaglini, Dover, NH (US);
Steven Lumetta, Champaign, IL (US);
Muriel Medard, Cambridge, MA (US);
John D. Moores, Groton, MA (US);
Salil A. Parikh, Belmont, MA (US);
Mark R. Parquette, Rye, NH (US)

(73) Assignee: NetApp, Inc., Sunnyvale, CA (US)

( * ) Notice: Subject to any disclaimer, the term of this patent is extended or adjusted under 35 U.S.C. 154(b) by 1086 days.

(21) Appl. No.: 09/994,475

(22) Filed: Nov. 26, 2001

Related U.S. Application Data

(60) Provisional application No. 60/250,197, filed on Nov. 29, 2000.

(51) Int. Cl.
*H04J 14/02* (2006.01)
*H04J 14/08* (2006.01)
(52) U.S. Cl. .......................... 398/75; 398/70
(58) Field of Classification Search ............ None
See application file for complete search history.

(56) References Cited

U.S. PATENT DOCUMENTS

| | | | | |
|---|---|---|---|---|
| 5,289,302 A | * | 2/1994 | Eda .......................... | 398/51 |
| 5,369,515 A | * | 11/1994 | Majima ....................... | 398/59 |
| 5,452,115 A | * | 9/1995 | Tomioka ..................... | 398/75 |
| 5,845,152 A | * | 12/1998 | Anderson et al. ............ | 710/52 |
| 5,892,916 A | * | 4/1999 | Gehlhaar et al. ............ | 709/223 |
| 6,009,490 A | * | 12/1999 | Fukui et al. ................. | 710/113 |
| 2003/0041168 A1 | * | 2/2003 | Musoll ....................... | 709/238 |
| 2003/0189935 A1 | | 10/2003 | Warden et al. | |

OTHER PUBLICATIONS

Chan, V.W.S. et al. "Architectures and technologies for high-speed optical data networks." Journal of Lightwave Technology, vol. 16, No. 12, Dec. 1998: 2146-2168.*
Modiano, E. "Random algorithms for scheduling multicast traffic in WDM broadcast-and-select networks." IEEE/ACM Transactions on Networking, vol. 7, No. 3, Jun. 1999: 425-434.*

(Continued)

*Primary Examiner*—Leslie Pascal
(74) *Attorney, Agent, or Firm*—Perkins Coie LLP

(57) ABSTRACT

A system for simultaneously transmitting and receiving multiple data messages on a unidirectional ring having a plurality of nodes coupled thereto is described. This technique utilizes a medium access (MAC) protocol for a multi-gigabit-per-second local-area optical wavelength division multiplexed (WDM) network that is particularly well suited for high-performance computing environments that need a network that provides quality of service and the ability to enforce service level agreements. The protocol uses an asynchronous, unslotted, tokenless, and collision-free access scheme that is arbitrated by a centralized scheduler. The embodiment is based on a folded-bus unidirectional ring that is passively optically tapped by the nodes to both transmit data onto the network and to receive data from the network. The system includes a scheduler based on a master/slave protocol that provisions and regulates data flow on the network, and uses a dedicated out-of-band control wavelength to broadcast scheduler directives to the nodes in the network.

25 Claims, 6 Drawing Sheets

OTHER PUBLICATIONS

Modiano, E. and R. Barry. "Design and analysis of an asynchronous WDM local area network using a master/slave scheduler." Proceedings. IEEE INFOCOM '99, vol. 2, Mar. 21-25, 1999: 900-907.*

Ganz, A. et al. "Time-wavelength assignment algorithms for high performance WDM star based systems." IEEE Transactions on Communications, vol. 42, No. 2/3/4, Feb./Mar./Apr. 1994: 1827-1836.*

Weik, Martin H. "Time slot." Fiber Optics Standard Dictionary. 3rd ed. 1997.*

Montgomery, M. "A review of MAC protocols for all-optical networks." <http://citeseer.ist.psu.edu/422722.html>. 1994.*

Rubin, I. and J.E. Baker. "Media access control for high-speed local area and metropolitan area communications networks." Proceedings of the IEEE, vol. 78, No. 1, Jan. 1990: 168-203.*

Abeysundara, B.W. and A.E. Kamal. "High-speed local area networks and their performance: a survey." ACM Computing Surveys (CSUR), vol. 23, No. 2, Jun. 1991: 221-264.*

Mukherjee, B. "WDM-based local lightwave networks. I. Single-hop systems." IEEE Network, vol. 6, No. 3. May 1992: 12-27.*

Lazar, A.A. et al. "MAGNET II: a metropolitan area network based on asynchronous timesharing." IEEE Journal on Selected Areas in Communications, vol. 8, No. 8, Oct. 1990: 1582-1594.*

Ramaswami, R. and K.N. Sivarajan. Optical Networks: A Practical Perspective. San Francisco: Morgan Kaufmann Publishers, Inc., 1998.*

Sachs, S.R. "Alternative local area network access protocols." IEEE Communications Magazine, vol. 26, No. 3, Mar. 1988: 25-45.*

Weik, Martin H. "address." Fiber Optics Standard Dictionary. 3rd ed. 1997.*

: "A Novel Medium Access Control Protocol for WDM-Based LAN's and Access Networks Using a Master/Slave Scheduler;" Modiano, Eytan and Barry, Richard; 2000 IEEE; Journal of Lightwave Technology, vol. 18, No. 4, Apr. 2000: pp. 461-468.

Mounir Hamdi et al., "Scalable High-Speed Switches/Routers with QoS Support", IEEE Communications Magazine, pp. 61, Dec. 2000.

Nong, G. and M. Hamdi, "On the Provision of Quality-of-Service Guarantees for Input Queued Switches," IEEE Communications Magazine, vol. 38, No. 12, Dec. 2000: 62-69.

* cited by examiner

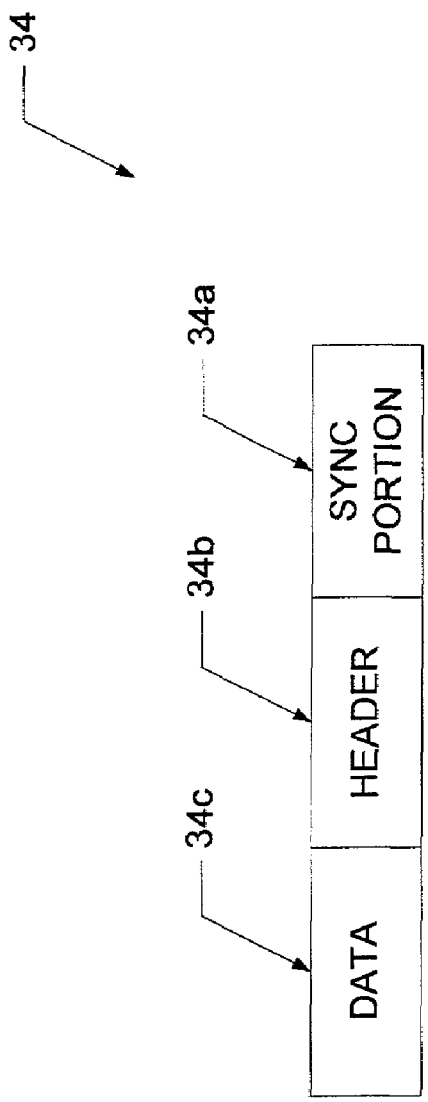

MULTIPLE ACCESS PROTOCOL SYSTEM AND RELATED TECHNIQUES FOR MULTI-GIGABIT OPTICAL WAVELENGTH DIVISION MULTIPLEXED LOCAL AREA NETWORKS

CROSS-REFERENCE TO RELATED APPLICATIONS

This application claims the benefit of U.S. Provisional Patent Application No. 60/250,197, filed on Nov. 29, 2000, the disclosure of which is hereby incorporated herein by reference.

STATEMENTS REGARDING FEDERALLY SPONSORED RESEARCH

Not applicable.

FIELD OF THE INVENTION

This invention relates generally to networks and more particularly to fiber optic networks.

BACKGROUND OF THE INVENTION

As is known in the art, there has been a recent trend to develop media access control (MAC) protocols for wavelength division multiplexed (WDM) local area networks (LANs). Most of these LANs are based on a broadcast star, and require global time synchronization (or a global common clock) to coordinate access to timeslots for data transmission to and from the nodes (sometimes referred to as optical terminals). Most of the protocols also use an out-of-band Aloha-based collision scheme to access the control channel, or a reservation system that uses a slotting scheme for data transmission and a minislot scheme for access to the reservation and control channel. One notable exception is Modiano's scheme, which uses an unslotted system for data transmission, but still uses a contention based system to access the control channel.

As the packet switching marketplace has matured, despite the trend of over-provisioning of bandwidth, there has been growing interest in providing greater levels of quality-of-service for high performance computer processing networks to ensure application performance, user prioritization, and compliance with service level agreements. For switched-ethernet networks, which is a currently predominant networking technology used in data/transaction processing centers, approaches to provide quality of service (QoS) include such schemes as priority queuing and weighted fair queuing, as well as numerous congestion control mechanisms. Some have been implemented into commercial systems, while others are in the standardization process or in academic literature.

SUMMARY OF THE INVENTION

In accordance with the present invention, a network includes a communication path having a first end and a second end and having a control channel and a data channel, a scheduler coupled to the communication path and a plurality of nodes, each of which has a first port coupled to the control channel to receive control messages, a second port coupled to the data channel to transmit data messages to the data channel and a third port coupled to the data channel to receive data messages traversing the data channel. In one embodiment, the scheduler operates in accordance with a centrally administered protocol which provisions and regulates data flow on the network and uses a dedicated out-of-band control wavelength to broadcast scheduler control messages to the nodes in the network.

With this particular arrangement, a network is provided which provides greater levels of quality-of-service than conventional networks, for high performance computer processing networks that ensures application performance and prioritization. In one embodiment, the communication path is provided as a unidirectional optical path that is passively optically tapped by the nodes to both transmit data onto the network, and to receive data from the network, and the scheduler is provided as a centralized scheduler which arbitrates a medium access control (MAC) protocol which implements an asynchronous, unslotted, tokenless, and collision-free access scheme. Thus, the nodes can simultaneously transmit and receive multiple data messages on the unidirectional optical path. The MAC protocol allows the network to operate as a multi-gigabit-per-second local-area optical wavelength division multiplexed (WDM) network that is particularly well suited for high-performance computing environments that need a network that provides quality of service and the ability to enforce service level agreements.

In accordance with a further aspect of the present invention, a scheduler adapted for use in a network which includes a communication path having a first end and a second end and having a control channel and a data channel and a plurality of nodes coupled to the optical path, includes a control message processor for transmitting on the control channel one or more control messages to each of the plurality of nodes, each of the control messages allotting to at least one node a time period corresponding to a data transmission time for a node. The scheduler also includes a scheduler timing processor, in communication with the control message processor, the scheduler timing processor for causing the control message processor to wait a period of time corresponding to the allotted data transmission time for a node prior to the control message processor releasing another control message.

With this particular arrangement, a scheduler arbitrating an asynchronous, unslotted, tokenless, and collision-free access scheme is provided. Upon reception of a control message by a node specified as a source node in the control message, the node immediately or after a delay known to both the scheduler and the node transmits data onto the optical path. Since the data transmission by the node immediately follows, or follows after a delay known to both the scheduler and the node, authorization provided by the control message, the system is asynchronous and unslotted. Nodes do not contend for access on the shared control channel; rather, they provide feedback to the scheduler via scheduled transmission. There is thus an inherent and intentional asymmetry in the control portion of the network. The scheduler not only allocates authorizations for node-to-node communication, but also for node-to-scheduler communication for tasks such as feeding back information and to collect management statistics. Node-to-Scheduler transmissions are carried on the data bearing wavelengths in the system, thus a node communicates to the scheduler as though the scheduler was just another node on the network. Therefore, there is no need for CSMA or Aloha-like schemes anywhere in the network.

In accordance with a still further aspect of the present invention, a medium access (MAC) protocol includes transmitting a control packet over a control channel of a local-area optical wavelength division multiplexed (WDM) network wherein the control packet specifies: (a) a first one of a plurality of nodes in the network as a source node; (b) a second one of the plurality of nodes in the network as a destination node; and (c) a value which corresponds to an amount of information which the source node can transmit. The protocol further includes waiting a predetermined period of time after transmitting the control packet before transmitting another control packet wherein the waiting time is related to the value specified in the control packet.

With this particular arrangement, a MAC protocol for a multi-gigabit-per-second local-area optical WDM network that is particularly well suited for high-performance computing environments that need a network that provides quality of service and the ability to enforce service level agreements is provided. The protocol implements an asynchronous, unslotted, tokenless, and collision-free access scheme that is arbitrated by a centralized scheduler.

BRIEF DESCRIPTION OF THE DRAWINGS

The foregoing features of this invention, as well as the invention itself, may be more fully understood from the following description of the drawings in which:

FIG. 3A is a schematic diagram of a control packet;

DETAILED DESCRIPTION OF THE INVENTION

Figure 1:
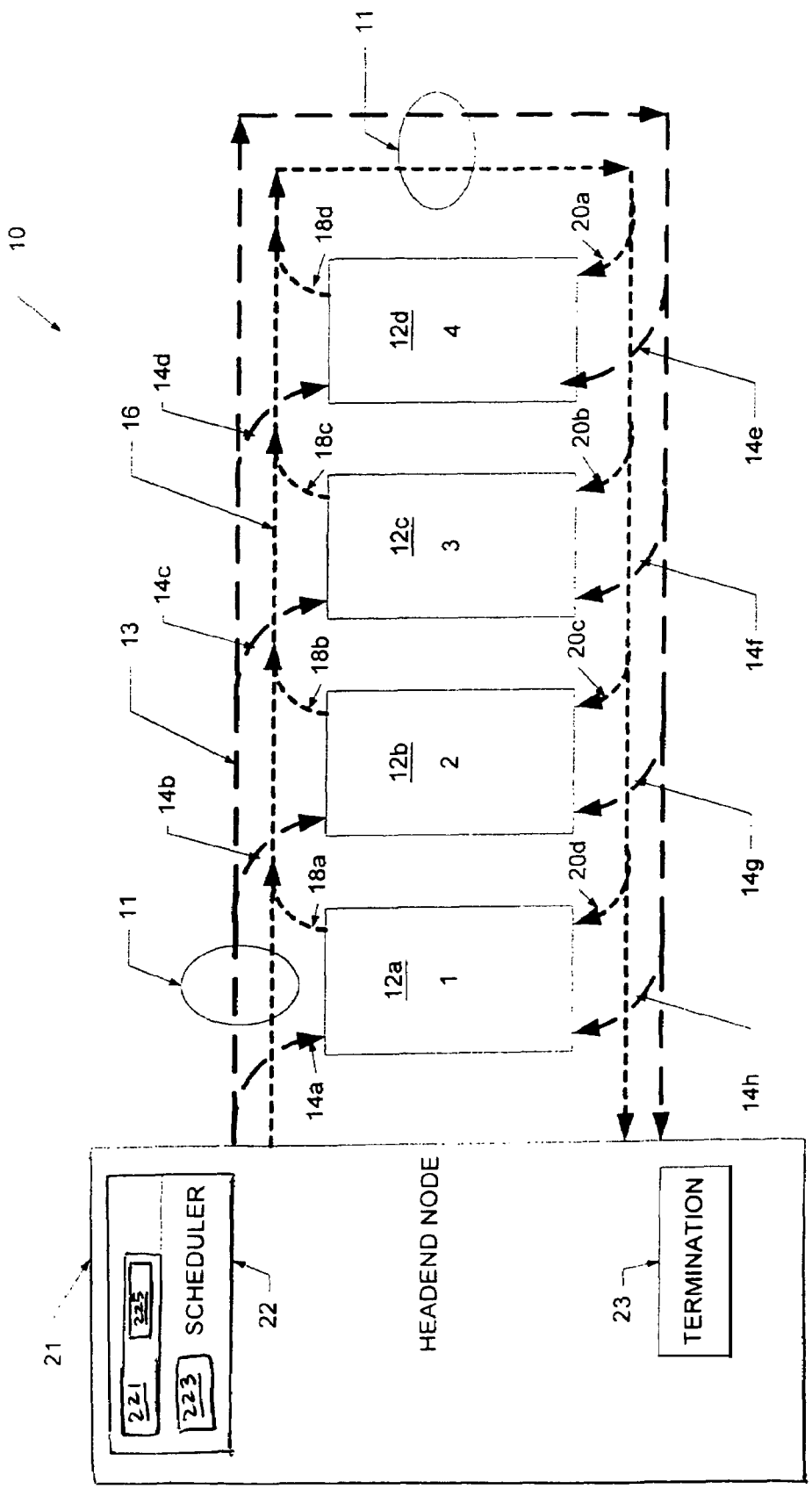
FIG. 1 is a block diagram of a system which includes a single data channel network.

Before describing the present invention in detail, some introductory concepts and terminology are explained.

Reference is sometimes made herein to communication paths of a particular type (e.g. an optical bus) or configured in a particular network topology (e.g. a folded bus topology). It should be understood, however, that the principles of the present invention can apply to a variety of different types of communication paths and media, including but not limited to so-called wireless paths. It should also be understood that the principles of the present invention can also be applied to networks having a variety of different types of network topologies. The particular type of communication path and network topology to use in any particular application is selected in accordance with a variety of factors.

In the example systems described herein, a centralized scheduler issues scheduler allocation messages (SAMs) to nodes on a dedicated unidirectional control channel. When a node receives a SAM authorizing the node to transmit a signal, the node immediately or after a delay known to both the scheduler and the node transmits on a data channel for the duration specified in the SAM. After waiting for the time allotted to that node, the scheduler then releases another SAM. Since the data transmission immediately follows the SAM, or follows the SAM after a delay known to both the scheduler and the node, the system is asynchronous and unslotted. Nodes do not contend for access on the shared control channel; rather, they provide feedback to the scheduler via scheduled transmission. There is thus an inherent and intentional asymmetry in the control portion of the network. The scheduler not only allocates authorizations for node-to-node communication, but also for node-to-scheduler communication for tasks such as feeding back information and to collect management statistics. Node-to-Scheduler transmissions are carried on the data bearing wavelengths in the system, thus a node communicates to the scheduler as though the scheduler was just another node on the network. Therefore, there is no need for CSMA or Aloha-like schemes anywhere in the network.

There is no random access available to the nodes. All transmissions must be preceded by an authorization message from the scheduler. As will be described below, in cases where the communication path includes an optical fiber, the system can achieve high utilization because of spatial reuse of the fiber and finer-grained control of quality-of-service. Only practical issues such as message processing time and physical issues such as laser tuning time and clock recovery time reduce the effective utilization. Generally, random access schemes offer nodes high throughput for light load conditions, while controlled access schemes provide high performance under heavy load conditions. The system described herein opts for the latter to ensure quality of service and predictable performance, especially during those periods when the network is experiencing high demand.

The exact schedules can be precisely and centrally controlled. The schedule can be configured like a round-robin scheduler, or can be customized for particular traffic patterns or to provide specific levels of quality-of-service to each node. By customizing the duration of the allocations given to each node, variable-length packets are supported, a precise network usage (i.e., "bandwidth") can be allocated to each node, and service guarantees can be made. Since this is a scheduled system, access delays are known and controlled, and synchronous services like voice and streaming video can be accommodated. Issues regarding fairness fall under the jurisdiction of the scheduler. The network manager can make the scheduler as fair or unfair as is appropriate for the applications that are running on the network. Furthermore, the scheduler assignments need not be statically configured and manually refined.

Reference is sometimes made herein to systems having a certain number of nodes (e.g. four nodes or eight nodes) with each node having a certain number of ports (e.g. 1 control channel port and one data channel port). It should be understood, however, that the concepts described herein apply to systems having any number of nodes and that the nodes may have any number of ports. It should be further understood that the particular embodiments mentioned herein are only intended to be exemplary and are not intended in any way to limit the scope of the invention. The particular number of nodes in a system in any particular application are chosen in accordance with a variety of factors particular to each application. Furthermore, other methods exist to provide different channels for control or data channels, including but not limited to wavelength division multiplexing, spatial division multiplexing, polarization division multiplexing, time division mutiplexing, or subcarrier multiplexing. These methods are well-known to those of ordinary skill in the art.

FIG. 1 is an exemplary system to illustrate the basic operation of the media access control (MAC) protocol. Subsequent figures extend the basic concept for use in a network with many nodes, and present modifications and optimizations to account for practical issues and to improve performance.

Referring now to FIG. 1, a network 10 includes a communication path 11 and a plurality of nodes 12a-12d generally denoted 12 coupled to the communication path 11. In a preferred embodiment, the communication path 11 corresponds to an optical path provided as a unidirectional folded bus provided from an optical fiber having a control channel 13 and a data channel 16.

A first end of the optical path 11 is coupled to a headend node 21 (or more simply a headend) which includes a scheduler 22. In some embodiments, the scheduler 22 includes a control message processor 221 and a scheduler timer processor 223. The control message processor 221 may include a scheduler authorization message (SAM) processor 225. A first end of the optical path 11 terminates at the scheduler 22 in the headend 21 and a second end of the optical path 11 terminates at a termination 23, also included in the headend 21.

Each of the nodes 12 couple information from the control channel 13 into a first port of the node 12 as indicated by paths 14a-14h. In particular, the nodes 12 couple control messages from the control channel 13 via the paths 14a-14h. Similarly, each of the nodes 12 passively couple data onto the data channel 16 for transmission as indicated by paths 18a-18d. The nodes 12 receive information from the data channel 16 via the paths 20a-20d. In a preferred embodiment, the nodes 12 are passively coupled to the control and data channels 13, 16.

Protocol Operation

To illustrate the operation of the protocol, the system 10 is described utilizing a simplified instantiation. Consider the case in which the communication path 11 is provided as a unidirectional folded-bus 11 having one control wavelength (control channel) and one wavelength used for data transmission (data channel). That is, all nodes use the same wavelength to transmit and receive data. It should be appreciated, of course, that in alternate embodiments the data wavelengths need not be the same.

The headend 21 node sends control packets over the control channel 13 on an outbound bus segment. Nodes 12 passively tap the outbound fiber to receive the control packets propagating on the control channel 13. The nodes 12 do not need the ability to modify bits on the outbound segment as is common in conventional folded bus schemes, nor do they need to perform any optical-to-electronic and electronic-to-optical conversions as is also common in the art.

Each node also taps into the outbound fiber to inject its data on the data channel 16 of the outbound fiber. Each node 12 passively taps the inbound bus segment to receive both the control channel and the data channel. It should be appreciated that although the control channel 13 and the data channel 16 are carried by the same fiber, they are completely separate from each other (e.g. the control channel 13 is "out-of-band" from the data on the data channel 16 in accordance, for example, with the principles of wavelength division multiplexing (WDM).

Initially, for the sake of clearly explaining the operation of the system, assume that the nodes can instantly process a control message after receiving the whole message (i.e. the nodes have zero message processing time), and that lasers in the system do not require tuning (i.e. the tuning times of lasers is zero), and that no guard bands or preamble sequences are needed to aid in clock recovery for the nodes to receive data. Further assume the network 11 starts from a quiet state, that is, the network 11 starts from a state in which there are no transmissions in progress.

In operation, the headend 21 dispatches a particular type of control message referred to as a scheduler allocation message (SAM). The SAM instructs a particular node, referred to as a source node, to transmit no more than a specified number of bytes to a specified node referred to as a destination node. That is, the SAM specifies a source node address (or more simply a "source address"), a destination node address (or more simply a "destination address"), and the number of bytes the source node may transmit.

As the SAM traverses the control channel 13 in the outbound fiber, all nodes 12 monitor the SAM, but only the node to which the SAM is addressed actually acts upon the SAM. After the source node for which the SAM is intended receives and processes the SAM, the node immediately or after a delay known to both the scheduler and the node transmits its data packets, but transmits no more bytes than are permitted by the SAM. If there are fewer bytes to transmit than the amount permitted by the SAM, the node simply stops transmitting, and any unused allocation is wasted and irrecoverable. If there are more bytes to transmit than the SAM has allocated, then the node must wait until the next time it receives a SAM. In this idealized example, the SAM precedes the data at each node as they travel around the bus together. The scheduler ensures that all nodes eventually transmit all of their data.

On the inbound side of the bus, all nodes listen to the SAMs as they propagate along the control channel 13 of the network 11. When a node receives a SAM that specifies its address as the destination node, the node listens to the data channel 16 for the bytes following the SAM. Since the bus is passively optically tapped, the nodes 12 do not remove or modify control or data from the bus as is done in many folded-bus access schemes. It should be appreciated that, advantageously, the nodes 12 need not maintain any timing or synchronization information. Also advantageously, the scheduler 22 needs no knowledge of the length of the bus or physical locations of the nodes 12. Nor do the scheduler 22 or nodes 12 need to perform timing procedures such as ranging (to determine the travel time of light along the length of the fiber), as is common in optical networks having a broadcast star topology. In the present invention, all nodes 12 asynchronously and immediately respond to control messages as they arrive. It should also be appreciated that in the present invention, because of spatial sharing of the bus, multiple transmissions can exist concurrently on the bus, unlike the situation in token based networks, where only one node-to-node transmission is active at any time.

After sending out the first SAM, the scheduler 22 waits for the number of byte-times allocated in the message, and then dispatches another SAM addressed to another node. The source node specified in the SAM responds by transmitting its data on the data channel 16, and the receive node specified in the SAM retrieves data from the data channel 16 of the network 11 as the data arrives on the inbound segment of the data channel 16 of the network 11 (e.g. one of paths 20a-20d). In this way, there is a steady stream of control messages and data transmissions propagating around the network 11.

It should be appreciated that in the above example the data channel 16 is dark when a control message is present on the control channel 13, and that there is no spatial overlap among the control messages and data transmissions. Techniques for mitigating such inefficiency will be described below. It should also be appreciated that the nodes 12 do not make reservations to access to the data channel 16. Rather, the scheduler 22 assigns to each of the nodes 12 periods of time in which the nodes 12 can transmit on the data channel 16. Nodes 12 never transmit anything on the control channel 13. During a network initialization process, a network administrator, or other user, specifies to the scheduler the amount of access to the communication path for each node as well as the order is which to send control messages to each of the nodes (i.e. network administrator pre-provisions the network).

The nodes 12 periodically need to communicate with the scheduler 22 to provide management information, or to request changes to the schedule to accommodate a temporary surge in the amount of traffic, or to cooperatively reduce their allocation when the opposite is true. The scheduler 22 also may need to periodically poll the nodes 12 to obtain management or statistical information. To do this, the scheduler 22 sends each node 12 a message with the scheduler 22 (which resides in the headend) as the destination node. Thus, communication between the nodes 12 and scheduler 22 is itself a scheduled event and the amount of communication path access time allotted to each of the nodes can change when the scheduler asks for feedback from the nodes and the nodes send a message to the scheduler requesting more or less communication path access time.

Because every transmission, whether node-to-node or node-to-scheduler, is a scheduled and provisioned event, absolute guarantees for bandwidth and latency can be offered, and quality-of-service claims can be unequivocally made. Furthermore, there is no need for congestion-control tactics as is the case in switched networks such as switched Ethernet, because the nodes 12 will never release data until told to do so by the scheduler 22. The state of the network 11 is known at all times, and each node's usage is regulated and controlled.

In the above description, several assumptions were made to promote clarity in the description including an assumption that the nodes 12 have zero message processing times. Nodes in practical systems (i.e. real system), of course, have non-zero message processing times and practical systems must account for such non-zero message processing times of nodes. One way to account for this is for the scheduler 22 to allow for extra time in the time segment that is allocated to a node so that the node can process the control message, and prepare data for transmission. This reduces the utilization of the bus because of dead time that the bus is not carrying a data transmission. However, if the processing delay is known, the scheduler can take this into account and issue a SAM for the next node in the scheduling list before the previous node has completed its transmission. By the time the message is processed by the new node, the previous node will have completed its transmission, and there will be no collision of data traffic on the bus when the next node begins transmission of its data. The same strategy can be used to account for transmitter and receiver tuning latencies, or any other source of known and constant delays between the reception of a control message and the time a node is ready to transmit its data.

It is, however, possible that a node will not have sufficient time to prepare packets and prepare them for transmission in the time allotted by the SAM. Suppose packet data is maintained in host memory or in a storage area network (SAN). A SAM arrives for node 1 permitting it to send data to Node 2. The node may need significant time to retrieve the appropriate packets from the host memory or the SAN. This problem can be handled by providing a look-ahead capability in the SAM. Since the scheduler is temporally omniscient (having knowledge of its future scheduling plans), it can include a preview of the next SAM in the current SAM. This way, a node can commence retrieval of packets and perform any necessary pre-processing while waiting for the official SAM to arrive. The arrival of the next SAM provides the signal to transmit, and provides a peek at what will be issued next.

Numerous variations on this scheme are also possible. For example, the scheduler could provide nodes with much information about future allocations several steps in advance so that the node can prepare for them. This might be necessary in especially high-rate networks. Another alternate embodiment is that a single scheduler can service several independent buses, by using the empty space between SAMs on one bus to issue SAMs for another bus. Consider a case with two buses, for example. The scheduler issues a SAM for the first bus. Some time after issuing that SAM, the scheduler issues a SAM for the second bus before issuing the next SAM for the first bus. The scheduler broadcasts all SAMs on all buses. Both buses receive all the SAMs, but each node ignores messages not relevant to it or its bus. With the addition of a switching element located at the headend, nodes on two buses can be connected as needed to allow communication between nodes that are normally on separate buses. If the selection of nodes on a bus is chosen such that most data traffic is between the nodes on one bus, then the buses run independently most of the time, with relatively infrequent interconnection to allow for communication to others nodes.

As mentioned above, feedback messages from the nodes can be used to make adjustments to the schedule. Feedback indicating the length of transmit queues allows the scheduler to increase or decrease bandwidth to connections as needed. Therefore, bursts of traffic can be accommodated, and lightly used connections do not waste bandwidth. Feedback indicating the remaining space in receive buffers allows the scheduler to reduce bandwidth to a particular node if necessary, ensuring that packets are not dropped due to buffer overflow.

One method of providing service guarantees as well as efficiently allocating bandwidth is to divide the schedule into "static" and "dynamic" components. Connections with service level agreements or other quality of service requirements would be allocated bandwidth from the static component of the schedule. Connections without specific quality of service requirements would be allocated bandwidth from the dynamic component of the schedule. The static portions of the schedule would stay constant for relatively long periods of time and generally only change when a new connection is setup or an existing connection ends. However, feedback indicating that a receive buffer is near capacity could also result in minor, temporary changes. The dynamic portions of the schedule would constantly adjust to feedback information.

Quality of service requirements can typically be described according to a connection's priority, bandwidth requirement, and type. A connection's type can indicate whether the connection requires regularly scheduled intervals, whether packets need to be acknowledged, etc. The ability to schedule connections exactly provides the flexibility to handle any quality of service requirements that can be described according to these metrics.

Figure 2:
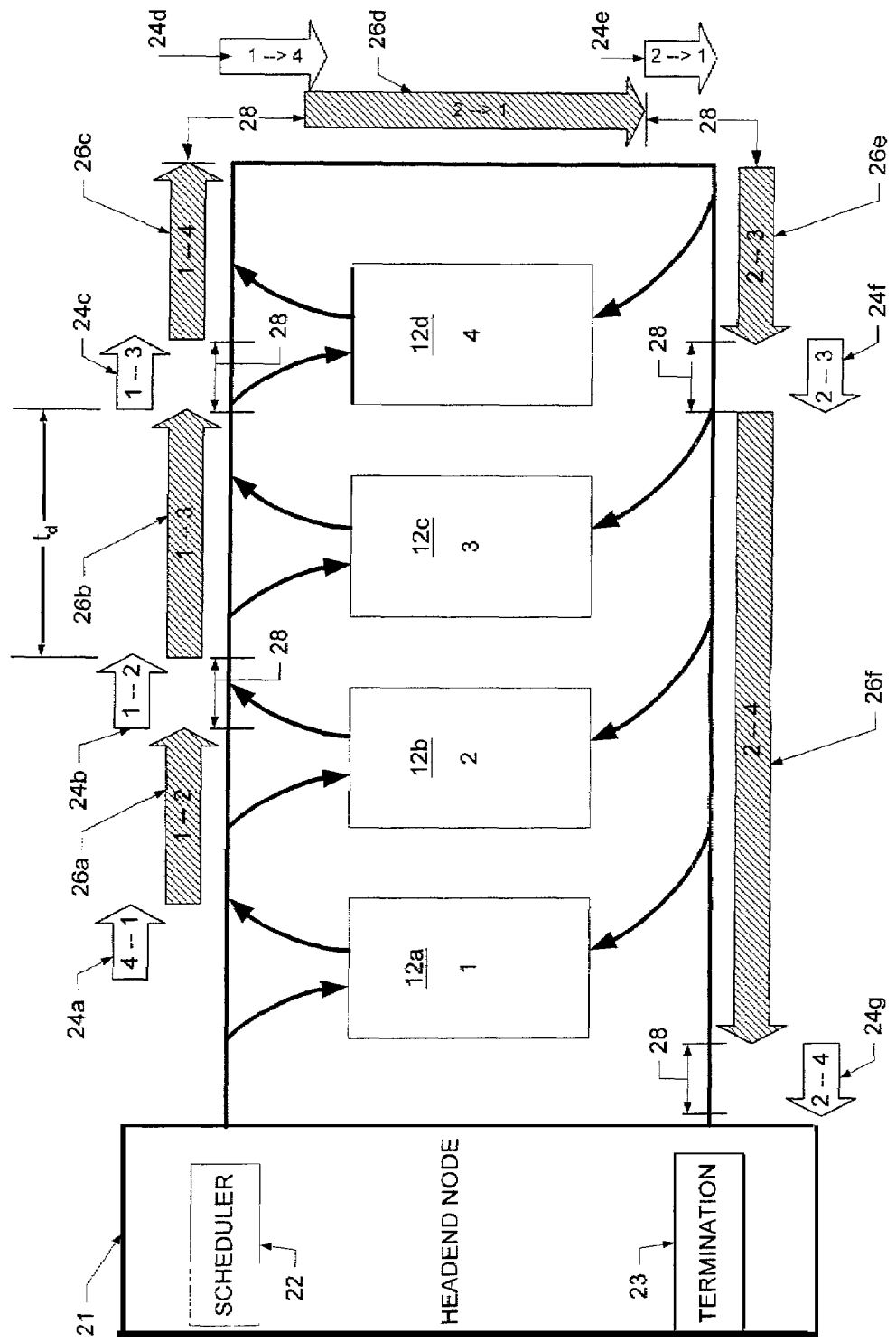
FIG. 2 is a block diagram of a system which includes a single data channel network with spatial sharing.

Referring now to FIG. 2, in which like elements of the system described above in conjunction with FIG. 1 are provided having like reference designations, scheduler 22 utilizes control messages 24a-24g, generally denoted 24 to control when each of the nodes 12a-12d transmits data messages 26a-26f (or more simply or "data") onto the data channel 16. Each of the nodes 12 receives control messages 24 through respective ones of the control paths 14a-14h (FIG. 1). Each of the nodes 12 transmits data onto the network via data channel paths 18a-18d (FIG. 1) and each of the nodes 12 receive data off the network via paths 20a-20d (FIG. 1).

It should be appreciated that the data messages 26a-26f vary in size in accordance with the number of bits specified by the control messages. In this manner, one can "tune" the system to provide some of the nodes 12a-12d with more time and others of the nodes 12a-12d with less time in which to transmit data. Each of the data messages 26a-26f, however, have a minimum length to thus provide each of the nodes 12 with a minimum amount of time in which data can be transmitted onto the network data channel 16. The control messages 24, on the other hand, can be a fixed size or of varying sizes. Typically the control messages 24 are a fixed size because they all carry source, destination, and allocation information in fixed-length fields.

Control message 24b indicates that node 1 (designated as node 12a in FIGS. 1 and 2) has permission to transmit data to node 2. Thus, in response to node 12a receiving the control message 24b, node 12a transmits data message 26a onto the data channel (e.g. channel 16 in FIG. 1). The data message 26a travels around the entire network to port 20c where node 2 (designated as node 12b in FIGS. 1 and 2) receives the data message 26a. In this manner multiple data messages 26 can exist on the network simultaneously. This is a technique referred to as spatial sharing. It should be appreciated that periods 28 exist between the data messages. These periods 28 are referred to as "dead times" since they correspond to time periods or regions in which no data is transmitted on the network. It should also be appreciated that in some embodiments a third port may be added to the same side of the node 12b on which the ports which accept the control and data channels of the network 11.

It should be appreciated that for the system to operate in the manner described above, a clock recovery scheme which can continuously resynchronize to the traffic on the network is required. It should also be appreciated that it is necessary to be able to finely control the delay time between scheduler messages referred to as a period $T_d$ as shown in FIG. 2. It should further be appreciated that all connections between nodes 12a-12d are provided via passive taps and couplers.

Figure 3:
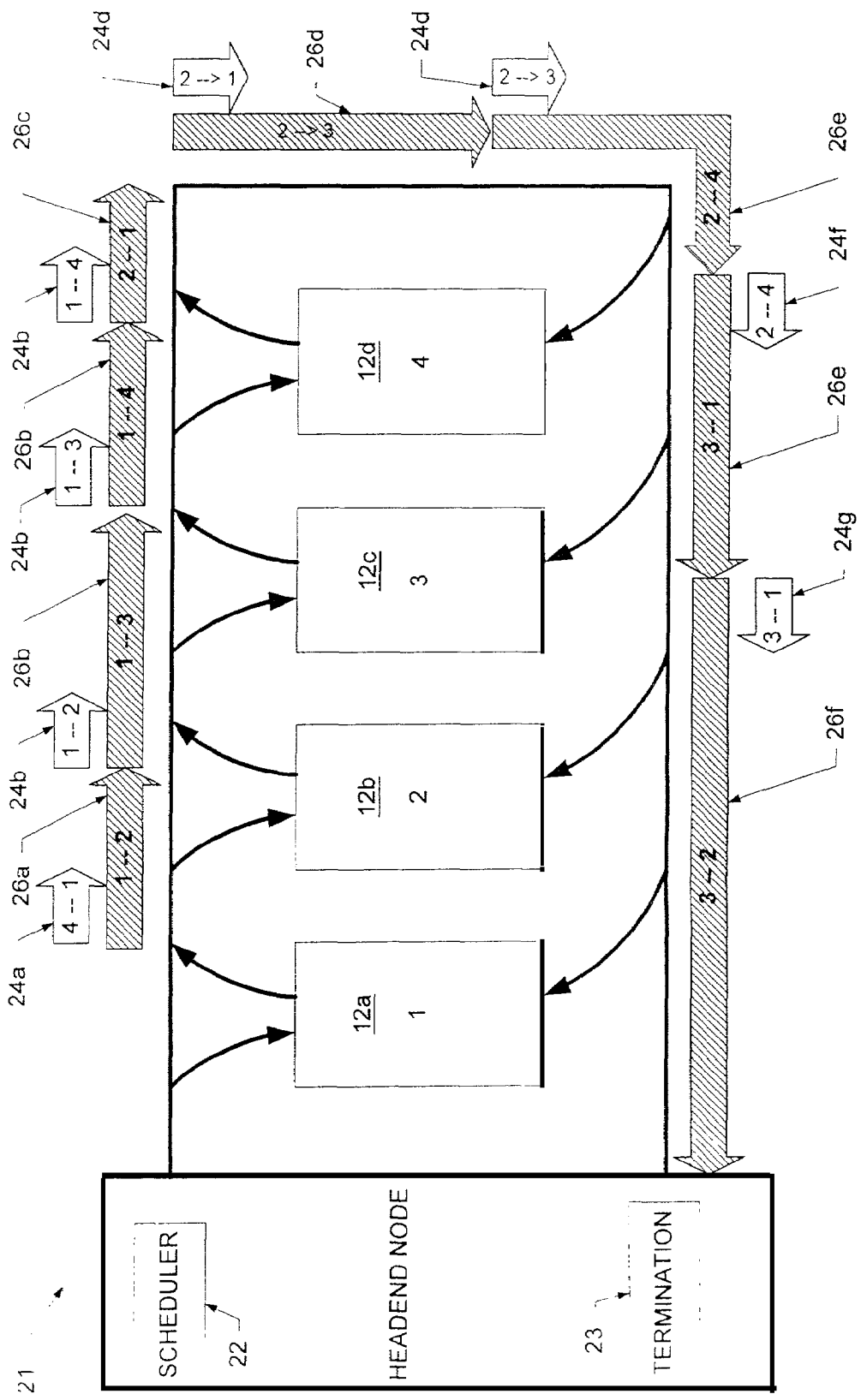
FIG. 3 is a block diagram of a system which includes a single data channel network with efficient packing.

Referring now to FIGS. 3 and 3A, the system 10 is shown operating in an efficient packing mode. It should be noted that in this mode, the dead times 28 described above in conjunction with FIG. 2, are eliminated and each data message is spaced from a prior data message such that no dead time exists. In this embodiment the data messages are provided from frames 34 which typically include a "sync portion" 34a (provided from idle commands), a header portion 34b and a data portion 34c. One problem with this approach is that there is zero latency processing time from when the node receives the control message and the time it must send the data. This problem will be addressed using a technique to be described below in conjunction with FIG. 4.

It should be observed that the scheduler releases a SAM such that it gets overlapped with the preceding data, and that the end of the SAM and the end of the preceding data coincide in time. Using this technique, there is no wasted time in between data transmissions. This technique gives high utilization of the bus. Thus, the advantage of the technique shown in FIG. 4 is that there is an optimization of the dead times which occur as a result of using the technique described above in conjunction with FIG. 2.

It should be appreciated that the timing is very important in the technique shown in conjunction with FIG. 3. because there is no dead time in between data transmissions for a node to use a delimiter between transmissions, and that the nodes must precisely know when to start and stop listening, otherwise the node would listen to the wrong data, or miss data that was intended for it. The clock recovery process, however, might be easier to implement since there are no gaps between the data messages. Clock recovery systems suffer more during long periods of no activity than during brief interruptions in the bit stream. The system is totally asynchronous (from packet to packet) and there is no need for a global clock. It should be noted that many scheduled systems either assume a time-division slotted system or a global clock.

Figure 4:
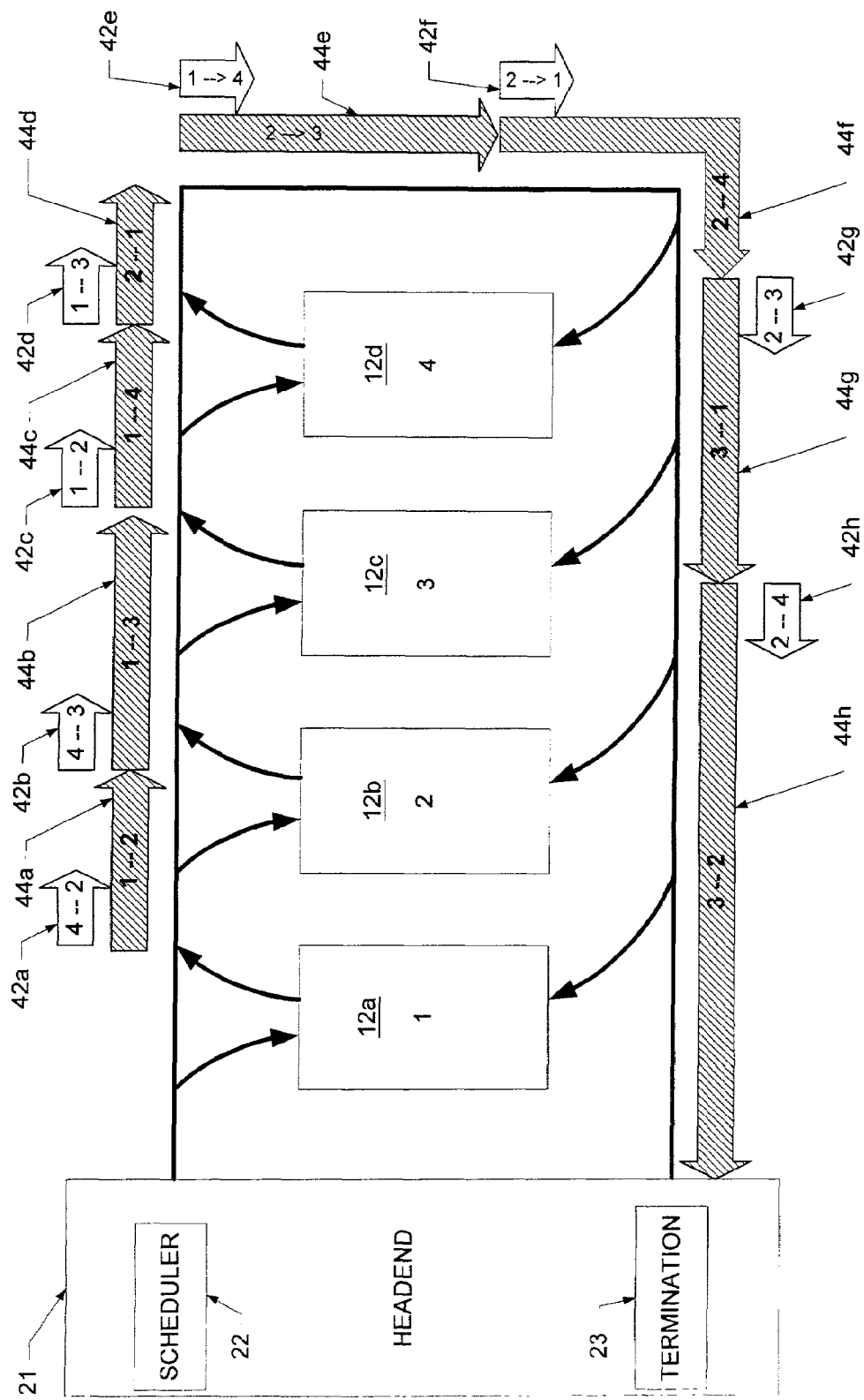
FIG. 4 is a block diagram of a system which includes a single data channel network with look-ahead timing.

Referring now to FIG. 4 in which like elements of FIGS. 1-3 are provided having like reference designations, the system 39 includes a scheduler 40 which utilizes a look-ahead timing technique. Using this technique, each of the control message 42a-42h cause each of the nodes 12 to send what the node 12 has in its queue and to prepare to send data from one node to the next as indicated by the control message 42. It should be noted that a dead time 43 exists in the control channel but that no dead time exists in the data channel. However, since the control channel is only transmitted upon by the scheduler, the dead times can be filled with idle bit sequences to reduce the need for high performance clock recovery circuits on the control channel receiving portion of the nodes.

In response to control message 42d, node 12a transmits what is in its queue and then prepares a message to be transmitted from node 1 (also identified as node 12a) to node 3 (also identified as node 12c). The amount of time that node 12a has to prepare to send the message to node 3 corresponds to the length (in time units) of the data message 44c. It should be noted that it may be necessary to provide the data message having a minimum length to ensure that there is enough time for each node to prepare the next message. Although the technique of the present invention is shown in conjunction with a folded bus topology, those of ordinary skill in the art should appreciate that the same techniques can be used on other topologies as well.

Figure 5:
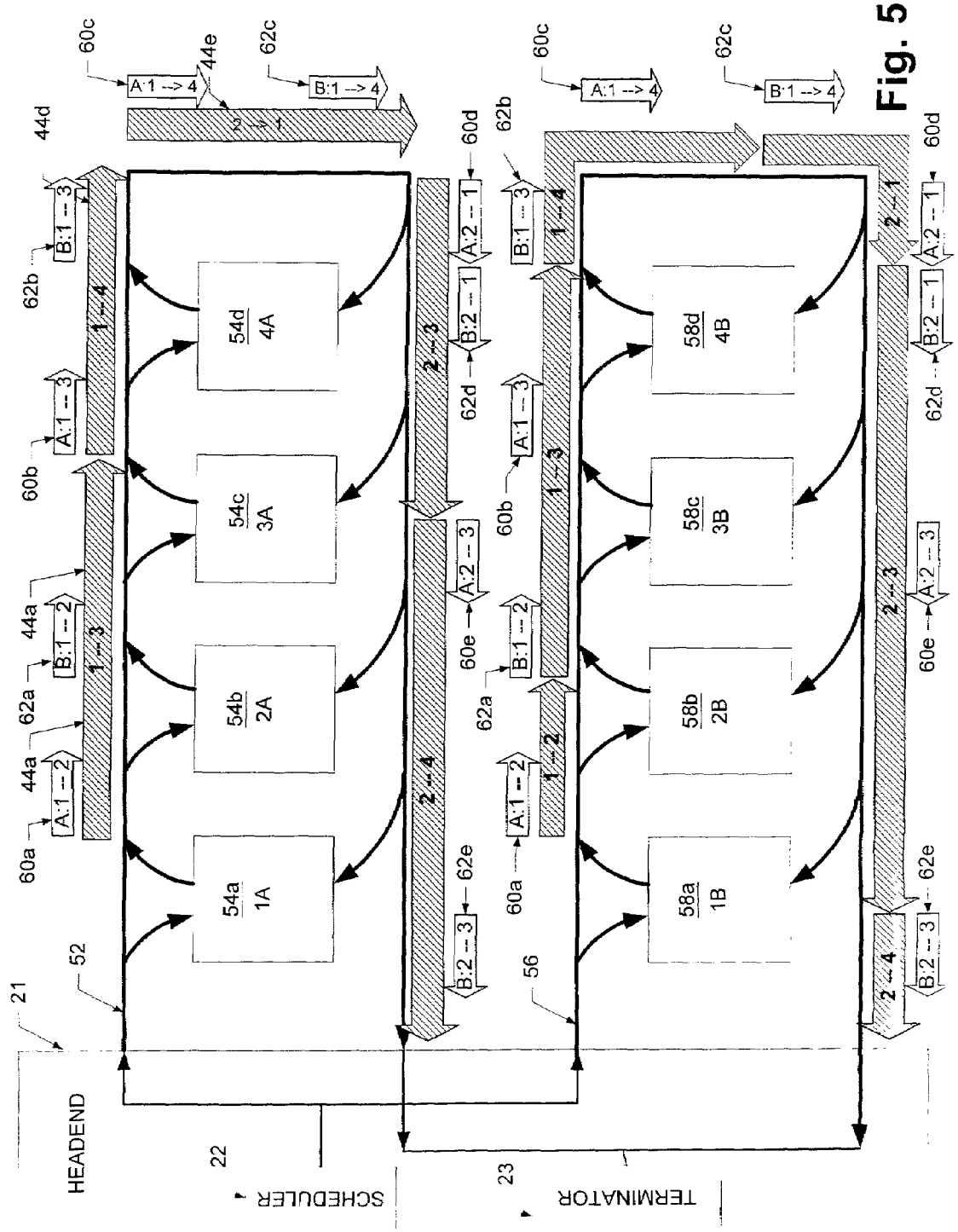
FIG. 5 is a block diagram of a system which includes multiple data channel networks and a single scheduler.

Referring now to FIG. 5, a scheduler 50 controls a pair of buses 52, 56. Bus 52 is coupled to a plurality of nodes 54a-54d while bus 56 is coupled to a plurality of nodes 58a-58d. Scheduler 50 transmits a plurality of control signals 60a-60e and 62a-62e. Control signals 60a-60e each include an identifier indicating that these control messages are intended for nodes 54a-54d coupled to bus 52.

Similarly, each of the control messages 62a-62e include a code or identifier which notify bus 56 that these messages are intended for one of nodes 58a-58d. In this manner scheduler 50 can transmit all control signals to each of the buses 52, 56 and the nodes 54a-54d and 58a-58d receive only those control messages intended for that node. In this manner the scheduler 50 controls multiple networks because it leaves control messages for each network on the control channel. That is, by having the control message specify the bus to which it pertains, the scheduler 50 is able to effectively send signals to a plurality of buses.

Extension to WDM

It should be appreciated that in the interest of elucidation, the above examples only considered a bus with one data-bearing channel. The scheduling system of the present invention can be extended to handle multiple wavelengths in a system with multiple buses in a straightforward manner. First consider a system with two buses, each with a distinct data-bearing wavelength, and with a common control channel (as before). The situation might be that the transmitters are not tunable while the receivers are. Furthermore, other methods exist to provide different channels for control or data channels, including but not limited to wavelength division multiplexing, spatial division multiplexing, polarization division multiplexing, time division mutiplexing, or subcarrier multiplexing. These methods are well-known to those of ordinary skill in the art.

Implementation

A straightforward way to implement the control channel and control messages is to use standard Gigabit Ethernet, running in simplex mode, to broadcast the control messages over the control channel. Scheduler messages would be encapsulated within Ethernet frames. While the exact fields would depend on the services provided by the system, fields can include: source address, destination address (including a broadcast address), time allocation (specified as number of bytes), wavelength, and protocol identifiers (to describe the format of the data contained in the transmission). Although using standard link protocols like Ethernet or ATM to carry the scheduling messages may not be optimal (because of inherent protocol overheads), the ability to leverage chipsets, device drivers, and link coding standards may be more influential in the final decision.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method to implement a medium access control (MAC) protocol for a local-area optical wavelength division multiplexed (WDM) network, the method comprising:
controlling inter-node communication on the WDM network by transmitting a first control packet over a control channel of the WDM network, the WDM network including a scheduler, a data channel, and a plurality of nodes, each of the plurality of nodes coupled to the control channel and the data channel, the first control packet specifying a first one of the plurality of nodes in the network as a source node, a second one of the plurality of nodes in the network as a destination node, a value which corresponds to an amount of information which the source node can transmit, and a preview of a second control packet; and
after transmitting the first control packet, waiting a predetermined period of time related to the value specified in the first control packet.

2. The method of claim 1, further comprising:
receiving the first control packet at each of the plurality of nodes in the network; and
in response to the source node receiving the first control packet, transmitting from the source node onto the data channel an amount of information not greater than the amount specified in the first control packet.

3. The method of claim 2, wherein transmitting the amount of information includes transmitting one or more data packets immediately or after a delay known to both the scheduler and the node.

4. The method of claim 2, wherein receiving the first control packet at each of the plurality of notes in the network includes passively tapping the control channel at each of the plurality of nodes in the network to receive the first control packet.

5. The method of claim 1, wherein in response to the destination node specified in the control packet receiving the first control packet, the destination node monitors the data channel for data following the first control packet.

6. The method of claim 5, wherein the destination node specified in the first control packet retrieves the data from the data channel of the network.

7. The method of claim 1, wherein the amount of information specified in the first control packet corresponds to a predetermined number of data packets.

8. The method of claim 1, wherein in response to the node to which the first control packet is addressed receiving packet, immediately or after a delay known to both the scheduler and the node transmitting no more bytes than are permitted by the first control packet.

9. The method of claim 8, further comprising dispatching the second control packet after waiting for the predetermined period of time.

10. The method of claim 9, wherein at least one of a source node and a destination node specified in the second control packet is different than the source node and the destination node specified in the first control packet.

11. The method of claim 1, wherein the control channel and the data channel are carried by the same fiber and wherein the first control packet on the control channel is "out-of-band" from data on the data channel.

12. The method of claim 1 wherein transmitting the first control packet includes transmitting the first control packet from a headend of the network.

13. The method of claim 12, wherein transmitting the first control packet from a headend of the network includes the headend dispatching a scheduler allocation message (SAM).

14. The method of claim 13 wherein the SAM specifies a source node address, a destination node address, and at least one of: (a) a number of bytes the source node may transmit to the destination node; and (b) an amount of time in which the source node may transmit.

15. The method of claim 1, wherein the preview in the control packet comprises information specifying a second source node of the second control packet, and said method further comprises:
in response to the second source node receiving the first control packet, the second source node preparing to send data according to the preview in the first control packet.

16. A scheduler comprising:
an interface to couple to a plurality of nodes in a wavelength division multiplexed (WDM) network via a unidirectional optical path in the network, said unidirectional optical path having a control channel and a data channel;
a control message processor to transmit on the control channel one or more control messages to each of the plurality of nodes, each of the control messages including a preview of a next control message, and each of the control messages allotting to at least one node a time period corresponding to a data transmission time for a node; and
a scheduler timing processor, in connection with said control message processor, to cause said control message processor to wait a period of time corresponding to the allotted data transmission time for a node prior to said control message processor releasing another control message.

17. The network of claim 16 wherein the control and data channels are separate from each other.

18. The scheduler of claim 16 wherein said control message processor includes a scheduler authorization message (SAM) processor to transmit on the control channel one or more SAMs to each of the plurality of nodes.

19. The network of claim 17, wherein the control channel is out-of-band from the data channel.

20. The network of claim 16 wherein the individual data channels and control channels are distinguished by wavelength.

21. A method comprising:
periodically polling a plurality of nodes in a local-area optical wavelength division multiplexed (WDM) network to obtain statistical information on the plurality of nodes, said polling comprising sending a first control packet to each of the plurality of nodes over a control channel, the first control packet specifying a scheduler as a destination node, wherein each of the plurality of nodes sends feedback to the scheduler over a data channel in response to the first control packet, wherein the scheduler is in the only node that transmits on the control channel; and in response to a request from one of the plurality of nodes, transmitting a second control packet from the scheduler in the WDM network over the control channel of the WDM network, the second control packet including a first value corresponding to an amount of information which the one of the plurality of nodes can transmit, and a preview of a third control packet.

22. The method of claim 21, wherein the control channel and the data channel are in a unidirectional optical path within the WDM network.

23. The method of claim 22, further comprising:

in response to a second request from a second one of the plurality of nodes, transmitting the third control packet from the scheduler over the control channel after waiting the predetermined period of time, the third control packet specifying a second value corresponding to a second amount of information which the second one of the plurality of nodes can transmit, wherein the second value differs from the first value.

24. A method comprising:

receiving a first control packet over a control channel of a wavelength division multiplexed (WDM) network, the first control packet specifying a first one of a plurality of nodes in the WDM network as a source node, a second one of the plurality of nodes in the WDM network as a destination node, a value which corresponds to an amount of information which the source node can transmit, and a preview of a second control packet;

in response to the first control packet, retrieving, at a third one of the plurality of nodes, a plurality of data packets based on the preview of the second control packet;

receiving the second control packet over the control channel after at least a predetermined period of time related to the value specified in the first control packet; and in response to the second control packet, transmitting from the third one of the plurality of nodes the plurality of data packets over a data channel of the WDM network.

25. The method of claim 24, wherein the first and the second control packets are from a scheduler of the WDM network.

* * * * *

UNITED STATES PATENT AND TRADEMARK OFFICE
CERTIFICATE OF CORRECTION

PATENT NO.      : 7,646,979 B1                           Page 1 of 1
APPLICATION NO. : 09/994475
DATED           : January 12, 2010
INVENTOR(S)     : Ciancaglini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1569 days.

Signed and Sealed this

Sixteenth Day of November, 2010

David J. Kappos
*Director of the United States Patent and Trademark Office*